April 8, 1947.　　W. H. BLISS ET AL　　2,418,750
SIGNAL DETECTION SYSTEM
Filed Sept. 4, 1942　　3 Sheets-Sheet 3
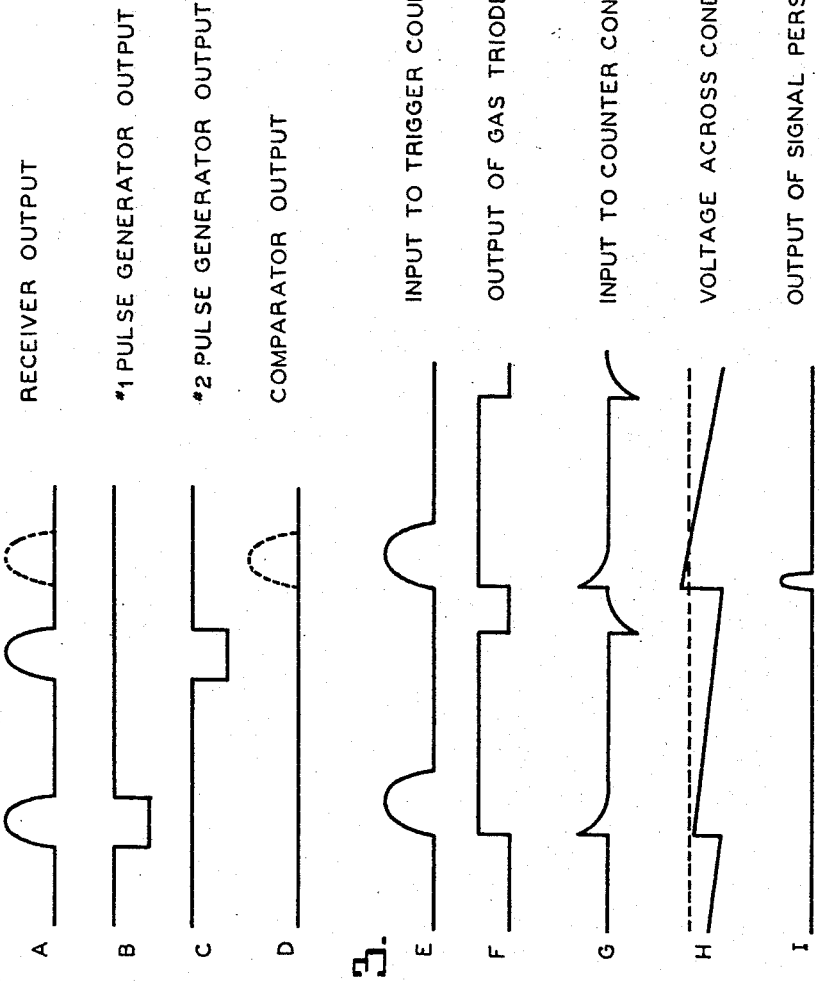
INVENTORS
J. ERNEST SMITH, WARREN H. BLISS
BY H. S. Grover
ATTORNEY

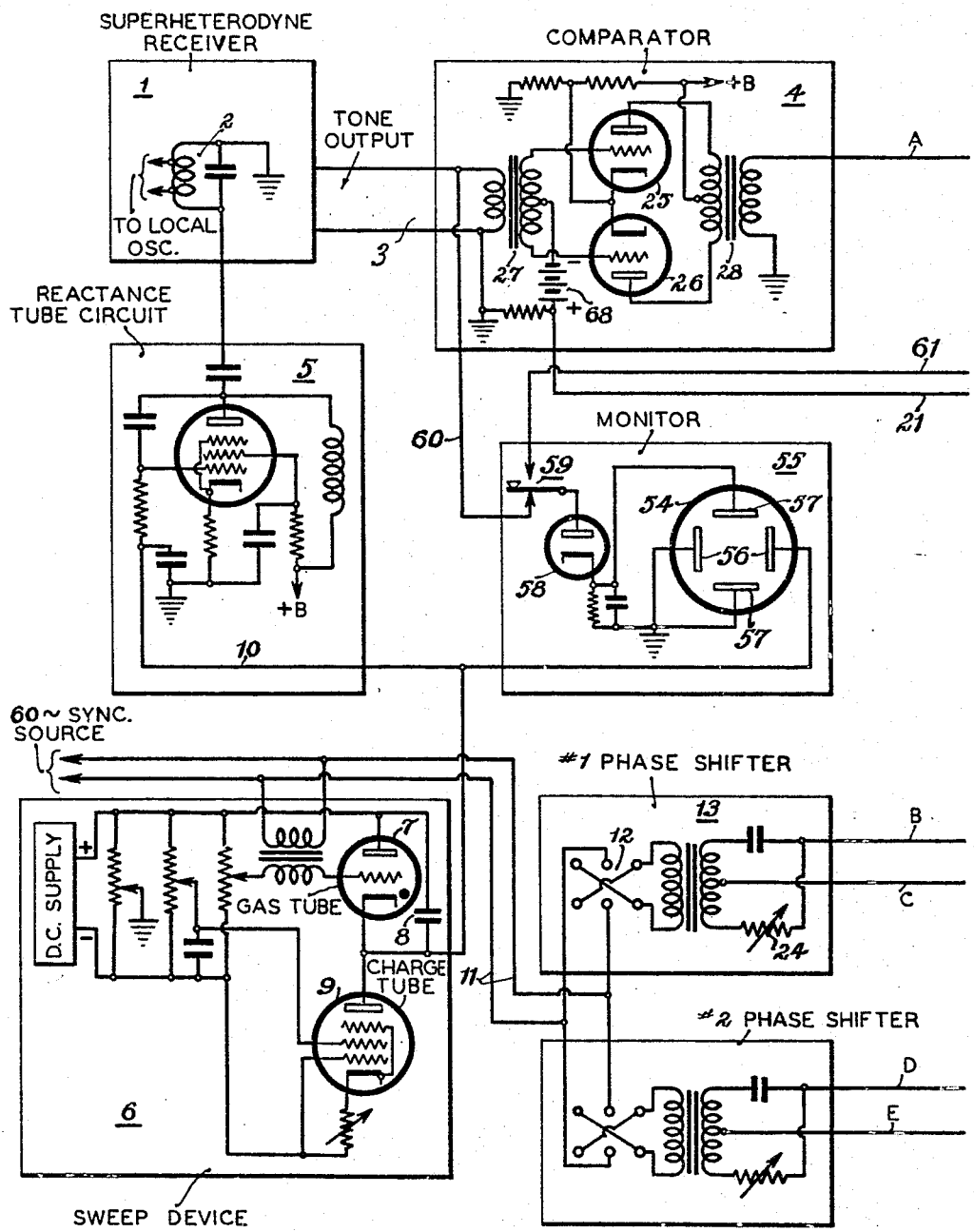

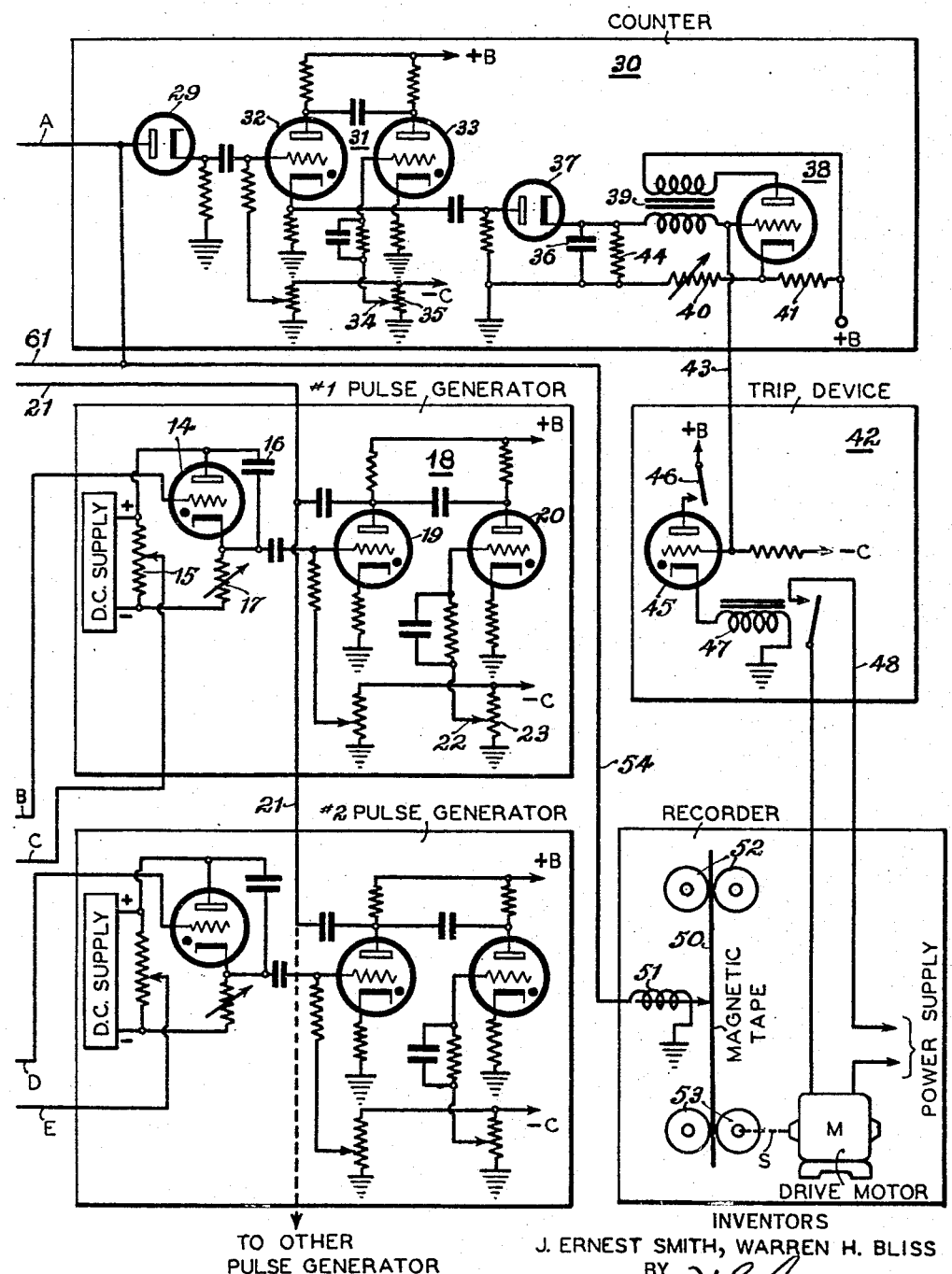

Patented Apr. 8, 1947

2,418,750

UNITED STATES PATENT OFFICE 2,418,750

SIGNAL DETECTION SYSTEM

Warren H. Bliss, Orono, Maine, and J. Ernest Smith, Jackson Heights, N. Y., assignors to Radio Corporation of America, a corporation of Delaware Application September 4, 1942, Serial No. 457,282

20 Claims. (Cl. 250—20)

The invention relates broadly to apparatus for scanning a given frequency band of the radio spectrum, locating any new signal which appears therein, and controlling a device for making a record of such a signal.

In monitoring the radio spectrum for enemy and illegal stations, a transmitter which suddenly goes into action, sends a short message at high speed, and then shuts down quickly is very hard to detect.

A primary object of the present invention is to provide a method of and apparatus for detecting the signals from such unknown stations.

In brief, the present invention is a scanning receiver for detecting and recording telegraph stations within the range of frequencies scanned by the receiver. For achieving the results of the invention, there is provided a superheterodyne receiver which is swept or tuned rapidly over a given band of frequencies by means of a sweep device. This sweep device has a speed of operation sufficient to enable the band of frequencies to be scanned by the receiver at least twice for each baud or dot length corresponding to the smallest unit of time measurement in telegraph code practice. The output of the receiver is arranged to be in the form of keyed tone whose modulations correspond to the modulations of the received signals. This keyed tone is supplied to a comparator device in which the signals of the known stations in the band of frequencies scanned by the receiver are neutralized or blanked out, so to speak, by locally generated pulses. To achieve this result, there are provided as many local blank-out pulse generators as there are different known stations in the band to be scanned. Thus, the presence of a new signal suddenly appearing in the frequency spectrum being scanned, will have no compensating or blank-out pulse and will be recorded in a local recording device.

A salient feature of the invention resides in the signal persistence checker or counter circuit, which serves to prevent random noise signals from falsely operating the recorder. Another feature of the invention resides in the use of the recorder mechanism and associated circuits which cause the recording mechanism to go into operation only when a new signal is detected which it is desired to record. At other times, the recorder remains inoperative.

A more detailed description of the invention follows in conjunction with the drawing, wherein:

Figs. 1a and 1b together illustrate, diagrammatically, a specific embodiment of the invention;

Fig. 2 graphically illustrates the manner in which the signals appearing in the output of the receiver corresponding to known telegraph stations are blanked out by locally produced pulses while a signal from an unknown station is passed on to the recorder; and Fig. 3 graphically illustrates the operation of the signal persistence checker or counter of the invention.

Referring to Figs. 1a and 1b in more detail, there is shown a superheterodyne receiver 1 indicated diagrammatically in box form. The heterodyne oscillator to the receiver (not shown) has its frequency controlled by a parallel tuned circuit 2. The receiver 1 is designed to receive telegraph signals, and is provided with a suitable tone keying circuit for supplying interrupted audio tone whose interruptions correspond to the modulations of the interruptions of the received telegraph signals. These keyed tone signals appear in the output circuit 3 of the superheterodyne receiver for subsequent use in the comparator device 4 to be described in more detail later. For causing the receiver to periodically scan a predetermined portion of the radio frequency spectrum, there is provided a reactance tube circuit 5 of a well-known type, whose anode is connected to the tuned oscillatory circuit 2 of the heterodyne oscillator of the receiver, and whose control grid is connected to the output of a sweep device 6 which generates saw tooth waves. Since the reactance tube circuit 5 is well known in the frequency modulation art for providing a variable reactance output dependent upon the modulating voltages applied to the grid of the device, it is not believed necessary to describe this circuit further.

The sweep device 6 for generating saw-tooth oscillations comprises, in the particular embodiment shown, a gaseous tube 7 which is arranged to rapidly discharge the condenser 8 through the space path of the tube after the charge on the condenser 8 has reached a critical value. A vacuum tube pentode 9 serves to charge the condenser 8 linearly. A sixty cycle synchronizing source, labeled as such, assures the breakdown of the gas tube 7 at a desired point in the cycle of operations. The output of the sweep device 6 is connected through lead 10 to the grid of the reactance tube 5 to provide sixty cycle saw-tooth waves per second to the reactance tube 5. As a result of this, the superheterodyne receiver will be caused to scan at a substantially uniform rate a predetermined portion of the radio frequency spectrum, after which the receiver will return to normal and repeat the scanning operation at the rate of sixty complete scanning operations per second. The range of the band of frequencies to be swept or scanned by the superheterodyne receiver is determined to a large extent by the magnitude of the saw-tooth variations of the sweep circuit, and the position of the band in the spectrum is adjustable by the usual controls in the receiver.

A multiplicity of blank-out pulse generators with their respective associated phase shifters are herein designated by the legends, #1 pulse generator and #2 pulse generator. Although only two generators are shown, there are usually provided as many pulse generators as there are known stations in the frequency band to be scanned whose signals are to be blanked out. If, in the operation of the system, there are more pulse generators than known stations, the excess number of pulse generators may be rendered inoperative by a suitable adjustment in a manner to be described later. All blank-out pulse generators are connected in parallel to the lead 21. Since the pulse generators are identical in construction and operation, it is deemed necessary to describe only one of these, let us say #1 pulse generator.

This pulse generator is supplied with energy from the sixty cycle synchronizing source over leads 11 through reversing switch 12 and phase shifter 13. The phase shifter consists of a sixty cycle transformer whose primary winding is connected to the reversing switch 12 and whose secondary winding has shunted across it a condenser and variable resistor 24. The junction of the condenser and variable resistor is connected to the grid of a gaseous discharge device 14 (sometimes known as a "Thyratron"). The center point of the secondary winding of the sixty cycle transformer is connected to a bias resistor 15 which supplies negative bias for the grid of the glow tube 14. The condenser 16 across the glow tube 14 is arranged to be charged through the variable resistor 17 and to be discharged through the space path of the tube at a sixty cycle rate. The voltage from condenser 16 is applied to a trigger circuit 18 composed of a pair of grid-controlled gas triodes 19 and 20 of the "Thyratron" type. Tube 19 is normally non-conductive while tube 20 is conductive. Upon the application of a pulse of suitable polarity from the condenser 16 to the grid of tube 19, the normal conditions of current conduction of the two tubes 19 and 20 will be reversed and there will be developed a negative pulse upon the anode of the tube 19 which is applied to the comparator 4 by means of lead 21. The duration of the pulse applied to lead 21 by the trigger circuit 18 is controlled by the bias on tube 20 and more specifically by the adjustment of tap 22 adjustable over bias resistor 23. The particular time of occurrence or position in the sweep cycle of the pulse obtainable from the trigger circuit 18 is controlled by adjustment of the phase shifter 13 and more specifically by the adjustable resistor 24 in the phase shifter. Since the adjustment of the resistor 24 of the phase shifter will only provide a variation in position of the pulse obtainable from the trigger 18 over substantially one-half or 180° of the sweep cycle, it thus becomes necessary to provide means for changing the position of the pulse in the sweep cycle over the entire cycle and this is accomplished by means of the reversing switch 12 which by its operation enables the adjustable resistor 24 of the phase shifter to control the position of the pulse obtainable from the trigger circuit 18 for any desired portion of either of the two halves of the cycle.

It should at this time be understood that the adjustment of the position of the pulse obtainable from the pulse generator is important because this position must be made to correspond to the position of the signal received from a known station in order to be able to blank-out the signal from the known station in the comparator 4. The adjustment of the duration of the blank-out pulse obtainable from the pulse generator is also important because the duration of the blank-out pulse must correspond to the duration of the signal received from the known station. The appearance of a blank-out pulse in the lead 21 will cause a relative negative pulse to be applied to the comparator 4 for reasons which appear hereinafter.

As for the comparator 4, this circuit comprises a pair of push-pull vacuum tube amplifiers 25 and 26 operating as class B; that is, normally biased to a point of anode current cut-off. The grids of these amplifiers are connected to opposite terminals of the secondary winding of a signal input transformer 27 which is designed to pass the keyed tone appearing in the output circuit 3 of the receiver. The connection from the midpoint of the secondary coil of transformer 27 to the negative terminal of a battery 68 assures the application of the desired negative bias to the grids of the vacuum tubes 25 and 26. The anodes of the tubes 25 and 26 of the comparator 4 are connected in push-pull to the opposite terminals of audio output transformers 28, also designed to pass the tone. In the operation of the comparator 4, the vacuum tubes 25 and 26 will normally pass the alternate half cycles of the tone appearing in the transformer 27. However, the application of a negative blank-out pulse from one of the pulse generators over lead 21 will supply an additional negative bias to the grids of the tubes 25 and 26 which will prevent these tubes from passing current even in the presence of tone signals on input transformer 27. It will thus be seen that by means of the pulse generators it is possible to prevent a comparator 4 from passing current at any particular time and for any desired duration in any sweep cycle.

The signal persistence checker or counter 30 serves to prevent random or fortuitous noise signals from falsely operating the recorder in the output of the counter. This signal persistence circuit comprises a rectifier 29 which rectifies the tone pulses appearing in the output of the transformer 28 of the comparator 4. The pulses rectified by tube 29 are applied to a trigger circuit 31 consisting of a pair of gaseous tubes 32 and 33, sometimes called "Thyratrons." This trigger 31 is similar in construction and operation to the trigger 18 of the pulse generator. Tube 32 is normally non-conducting, while tube 33 is normally conducting, and the application of a pulse of suitable polarity to the grid of tube 32 will reverse the states of conduction of the two tubes 32 and 33. A tap 34 slidable over resistor 35 serves to adjust the bias on the grid of tube 33, thus controlling the duration of conduction of the tube 32. A primary difference in the operation of the trigger 31 relative to the trigger 18 is that in the former case the tube 32 is made to be conductive upon the application of a pulse to the grid of this tube for a period of time almost equal to the duration of a sweep cycle, while in the latter case the duration of conduction of the tube 19 is limited to the duration of the blank-out pulse available for utilization in lead 21. The pulse obtainable from the pulse generator for use in lead 21 is normally less than 10% of the duration of the sweep cycle.

The output of trigger 31 in the signal persistence counter 30 is in the form of a pulse taken from the cathode of tube 32 and used to charge condenser 36 through a rectifier 37. When the condenser 36 is charged to a predetermined value which is determined by the rectified energy obtained from rectifier 37, as a result of the application of two or more pulses from the trigger circuit, the voltage on the condenser 36 will overcome the cut-off bias on a normally non-conductive regenerative circuit 38. Circuit 38 includes a vacuum tube amplifier whose anode and grid electrodes are connected to different windings of an audio frequency transformer 39. The bias on the grid of the circuit 38, as determined by the values of resistors 40 and 41, is such that it normally does not pass current. The presence of a critical charge on the condenser 36, of a value sufficient to reduce this bias on the grid of 38 by a suitable amount, will cause current to flow through the vacuum tube of the regenerative circuit 38. The initiation of current through this tube will cause the current in circuit 38 to increase very suddenly, thus causing the grid of the tube to become positive and producing a pulse of energy which is applied to the trip device 42 over lead 43. The sudden increase in current in the circuit 38 causes the condenser 36 to discharge all its energy after which, due to saturation of the tube, the circuit 38 will return to its normal condition of non-conduction. It will thus be seen that the conduction of the regenerative circuit 38 depends upon a critical value of charge on the storage condenser 36, which in turn depends upon a predetermined number of pulses in successive cycles produced by the trigger 31 and rectified by the rectifier 37. The resistor 44 is a leak resistor for the condenser 36 and serves to enable the charge on condenser 36 to leak off in the event that a fortuitous or random noise signal causes the trigger circuit 31 to be tripped, thus charging condenser 36 to a small value not sufficient to operate circuit 38.

The trip device 42 comprises a gaseous discharge tube 45 of the "Thyratron" type in whose anode circuit there is provided a switch 46 and in whose cathode circuit there is provided an electromagnetic relay 47. The armature of the relay 47 is connected to one terminal of a source of power supply for the drive motor M, while the make contact of the relay 47 is connected to the motor M over a lead 48. Normally, the switch 46 will be closed and the relay 47 not operated. The application of a pulse to lead 43 from the signal persistence counter 30 will cause the glow tube 45 to ignite as a result of which the relay 47 will operate and close an obvious circuit to operate the drive motor M.

A suitable recorder herein shown as a magnetic tape 50 in conjunction with a recorder coil 51 serves to record the signals of the unknown station which have been detected. This magnetic tape is normally stationary and upon the operation of drive motor M by the trip device 42 it is caused to move between pairs of rollers 52 and 53. The rollers 53 are, in effect, drive rollers which are linked to the motor M by shaft S. The recorder coil 51 is connected by means of lead 54 to the output of transformer 28 of the comparator, as a result of which any signals appearing in the output of the transformer 28 will be recorded on the magnetic tape 50, although movement of the magnetic tape will not occur until the signal persistence counter 30 has caused the trip device 42 to operate. It was previously pointed out that there were two or more complete scanning or sweep cycles for each baud or dot corresponding to the smallest unit of time measurement in the telegraph code. For this reason, there will be a plurality of magnetic pulses or recordings appearing on the magnetic tape caused by the multiple operation of recorder coil 51 during each baud of received detected signal from the unknown or newly found station. Assuming therefore that the recorder coil operates twice for each baud, the signals appearing on the magnetic tape will be in the form of closely spaced, extremely short magnetic pulses, the telegraph dot appearing as two short pulses on the tape, while the telegraph dash will appear as six short closely spaced pulses in a straight line on the magnet tape.

The purpose of the monitor circuit 55 is to enable the operator to make suitable adjustments in the system. This monitor consists of a cathode ray oscilloscope 54 having horizontal deflection plates 56 and vertical deflection plates 57, together with an associated rectifier 58 for applying rectified pulses to one of the vertical deflection plates 57. The anode of the rectifier 58 is connected to the armature of a switch 59 by means of which the rectifier can be connected either directly to the keyed tone output circuit 3 of the superheterodyne receiver by means of lead 60, or directly to the output of the comparator device 4 by means of lead 61. Thus, the attendant is able to observe at a glance by suitably operating the switch 59, the appearance of the pulses in the output of the superheterodyne receiver 3 and also the appearance of the pulses in the output of the comparator 4. If the system is properly adjusted, the keyed tone pulses appearing in the output of the superheterodyne receiver 1 will not appear in the output of the comparator 4, except for the signals corresponding to those from the unknown or newly found station.

The operation of the system as a whole will now be described: The particular portion of the radio frequency spectrum to be scanned will first be chosen by adjustments in the receiver in well known manner. The sweep device 6 will cause the heterodyne oscillator of the receiver to sweep its frequency sixty times per second, in order that the receiver will repeatedly scan the selected portion of the radio frequency spectrum. Let us assume that there are two known telegraph stations in the spectrum being scanned, and that the signals from these known stations appear as full line pulses in the line A of Fig. 2 corresponding to the receiver output as indicated on the monitor 55 when this monitor is connected to lead 60. Let us also assume that a newly found or unknown telegraph station appears in the frequency spectrum which is being scanned, and that the pulses from this newly found station correspond to the position shown by the dotted line pulse shown in line A of Fig. 2. This line A of Fig. 2 gives a visual picture on the monitor, of the frequency band which is scanned. By means of pulse generator 1 and pulse generator 2, the positions and durations of the blank out pulses from these pulse generators will be adjusted by the attendant to correspond to those illustrated in lines B and C of Fig. 2. The adjustments of the pulse generators are primarily made by means of the adjustable phase shifters 13 and the bias controls 22. Because the entire system is synchronized at sixty cycles, it will be evident that the pulse generators will each generate identical pulses for each cycle of scanning, although if desired the pulses may be different for the different pulse generators. The blank-out pulses generated by the pulse generators appear at different times in lead 21 and are of such polarity (negative) as to bias the comparator 4 to way beyond anode current cut-off at those times during which signals from the known stations are being received. Thus, the output of the comparator 4 will appear on the monitor 55, when switched to lead 61, in the manner indicated in line D of Fig. 2. It will be noted that only that pulse visually appears on the monitor 55 which corresponds to the newly found telegraph station, when the monitor is connected to lead 61.

The appearance in the output of the comparator 4 of the signal corresponding to the newly found station will excite recorder coil 51 for making a record on the magnetic tape. However, the magnetic tape, which is normally stationary, will not begin to move to furnish a continuous record until the signal persistence checker or counter circuit 30 has functioned to operate the trip device 42. This signal persistence checker or counter will function to operate the trip device 42 provided that the signal of the newly found station appears on two or more successive scannings. This causes the circuit 38 in the signal persistence circuit 30 to operate only when the charge on 36 has reached a critical value. This critical value can only occur when a desired number of pulses within a given length of time from trigger 31 are passed on to the rectifier 37. In this way the signal persistence circuit prevents the trip device 42 and drive motor M from operating in case a random noise signal is passed by the receiver and comparator on to the signal persistence counter 30. Since it is possible for very strong and persistent noise to cause the appearance of noise signals twice within two successive cycles of scanning at substantially the same positions, it is preferred that the circuit constants of the signal persistence counter 30 be so adjusted that at least three rectified pulses from the trigger 31 appearing on successive cycles be required to charge the condenser 36 to the critical value.

The operation of the signal persistence counter 30 may be better understood by referring to Fig. 3 wherein line E gives a visual picture of the input pulses to the trigger circuit 31. Line F indicates the conduction characteristic of the tube 32 of the trigger circuit 31. It should be noted that this tube 32 becomes conductive almost immediately upon the beginning of a pulse applied to the trigger and continues to be conductive for almost the entire length of the scanning cycle, after which it will again become conductive if the signal applied to the trigger circuit persists in the next cycle. The line G of Fig. 3 represents the pulses derived from tube 32 and which are rectifier by rectifier 37 for storing on condenser 36. Line H represents the voltage which accumulates across condenser 36 for application to the circuit 38. Line I represents the output of the signal persistence counter 30 for utilization by trip device 42. It should be noted that the single pulse in line I corresponds to the point at which the voltage across the condenser 36 reaches a critical value to cause the operation of circuit 38, assuming that only two successive pulses from the trigger 31 are sufficient to cause the charge on the condenser 36 to reach the desired critical value.

When the trip device 42 operates, a circuit is closed to operate the drive motor M to thereby move magnetic tape 50 and furnish a continuous record of the signals being recorded by coil 51. The signals recorded on the magnetic tape 50 are in the nature of short magnetic pulses, there being at least two for each baud duration of telegraph signal. These recorded signals may, to some extent, be compared to pencil dots on a paper tape, the number of dots determining whether a single baud or a dash have been recorded, it being understood, of course, that the dot and dash of the telegraph signal will be separated by a suitable space corresponding to the position of complete absence of signal.

What is claimed is:

1. A system for detecting radio stations transmitting telegraph signals, comprising a tunable radio receiver, means for periodically tuning said receiver over a selected band of frequencies, a local pulse generator having means for producing pulses of predetermined polarity and for adjusting the position and width of the generated pulse in each cycle, means for combining said pulses from said generator with the output of said receiver such that certain signal pulses from the output of said receiver and corresponding to received telegraph signals may be blanked out.

2. A system for detecting radio stations transmitting signal pulses within a predetermined portion of the radio frequency spectrum, a tunable receiver, means for periodically tuning said receiver over a selected band of frequencies corresponding to said portion of the frequency spectrum, an amplifier for the output of said receiver, a local pulse generator having means for generating a pulse for each tuning cycle of said receiver, said generator also having means for adjusting the position and the width of the generated pulse in each cycle of operation, a connection from said pulse generator to the input circuit of said amplifier for supplying said amplifier with pulses of such polarity as to bias said amplifier to anode-current cut-off during the occurrence of said pulses, whereby output signal pulses from said receiver corresponding to signal pulses received from known stations can be prevented from passing through said amplifier.

3. A system for detecting radio stations transmitting signal pulses, a tunable receiver adapted to receive said signal pulses, means for periodically tuning said receiver over a selected band of frequencies, an amplifier for the output of said receiver, a local pulse generator having means for generating a single pulse for each tuning cycle of said receiver, said generator also having means for adjusting the position and the width of the generated pulse in each cycle of operation, means for synchronously operating said pulse generator in timed relation with said periodic tuning means, a connection from said pulse generator to the input circuit of said amplifier for supplying said amplifier with pulses of such polarity as to bias said amplifier to anode-current cut-off during the occurrence of said pulses, whereby output signal pulses from said receiver corresponding to signal pulses received from a known station can be prevented from passing through said amplifier.

4. A system for detecting radio stations transmitting signal pulses, a tunable receiver adapted to receive said signal pulses, means for periodically tuning said receiver over a selected band of frequencies, means for converting the received signals to keyed tone output signals, an amplifier for passing the keyed tone signal output of said receiver, a local pulse generator, means for synchronously operating said pulse generator in timed relation with said periodic tuning means, said pulse generator having means for adjusting the position and the width of the generated pulse in each cycle of operation, a connection from said pulse generator to the input circuit of said amplifier for supplying said amplifier with pulses of such polarity as to bias said amplifier beyond anode-current cut-off during the occurrence of said pulses, whereby keyed tone output signals from said receiver corresponding to signal pulses received from a known station can be prevented from passing through said amplifier.

5. A system for detecting radio stations transmitting signal pulses, a tunable receiver adapted to receive said signal pulses, means for periodically tuning said receiver over a selected band of frequencies, means for converting the received signals to keyed tone output signals, an amplifier for passing the tone signal output of said receiver, a plurality of pulse generators, means for synchronously operating all of said pulse generators in timed relation with said periodic tuning means, said pulse generators each having means for producing a single pulse for each tuning cycle of said receiver, said generators also having means for adjusting the position and the width of the generated pulse in each cycle of operation, a connection from each of said pulse generators to the input circuit of said amplifier for supplying said amplifier with pulses of such polarity as to bias said amplifier beyond anode-current cut-off during the occurrence of said pulses, whereby keyed tone output signals from said receiver corresponding to signal pulses received from known stations can be prevented from passing through said amplifier.

6. In a radio receiving system for receiving signal pulses, a tunable receiver, means coupled to said receiver for periodically tuning the same over a selected band of frequencies, an amplifier coupled to said receiver for passing the output signals from said receiver, a recorder device associated with said receiving system and having a signal recording element, driving means linked to said recording element for causing said element to move whereby a continuous record of the signals to be registered can be made on said element, and a pulse counter circuit in the output of said amplifier and responsive to pulses appearing in said amplifier over successive tuning cycles for operating said driving means to move said recording element.

7. In a radio receiving system, a tunable receiver, means for periodically tuning said receiver over a selected band of frequencies, an amplifier coupled to said receiver for passing the output signals from said receiver, a signal recorder device operatively associated with said receiving system and having a tape, driving means linked to said recorder device for moving said tape to enable a continuous record of the signals to be registered to be made along the length of said tape, and a signal persistence circuit responsive solely to the presence of signals in the output of said amplifier over a predetermined number of tuning cycles for enabling the excitation of said driving means.

8. In a radio receiving system, a tunable receiver, means for periodically tuning said receiver over a selected band of frequencies, an amplifier coupled to said receiver and adapted to pass the output signals from said receiver, a recorder device, a connection from said recorder device to the output of said amplifier, a motor for driving an element of said recorder device upon which the signals are to be registered, a normally inoperative relay, contacts on said relay adapted to close an energizing circuit for said motor, and a signal persistence circuit coupled between the output of said amplifier and said relay, said signal persistence circuit being responsive solely to the presence of signals in the output of said amplifier over a predetermined number of tuning cycles for causing the operation of said motor.

9. In a radio receiving system, a tunable receiver, means for periodically tuning the receiver over a selected band of frequencies, means for converting the received signals to keyed tone output signals, an amplifier for passing the tone signal output of said receiver, a local pulse generator, means for synchronously operating said pulse generator in timed relation with said periodic tuning means, said pulse generator having means for adjusting the position and the width of the generated pulse in each cycle, a connection from said pulse generator to the input circuit of said amplifier for supplying said amplifier with pulses of such polarity as to bias said amplifier beyond anode-current cut-off during the occurrence of said pulses, whereby keyed tone output signals from said receiver corresponding to signals received from a known station can be prevented from passing through said amplifier, a signal recorder device associated with said receiving system, and a signal persistence circuit coupled to the output of said amplifier and controlling the operation of said recorder device, said signal persistence circuit being responsive to the presence of signals in the output of said amplifier for a predetermined number of times over successive cycles of receiver scanning for causing said recorder device to continuously register a substantially complete message.

10. In a radio receiving system, a tunable receiver, means for periodically tuning receiver over a selected band of frequencies, means for converting the received signals to keyed tone output signals, an amplifier for passing the tone signal output of said receiver, a local pulse generator, means for synchronously operating said pulse generator in timed relation with said periodic tuning means, said pulse generator having means for adjusting the position and the width of the generated pulse in each cycle, a connection from said pulse generator to the input circuit of said amplifier for supplying said amplifier with pulses of such polarity as to bias said amplifier beyond anode-current cut-off during the occurrence of said pulses, whereby keyed tone output signals from said receiver corresponding to signals received from a known station can be prevented from passing through said amplifier, a monitor circuit, and switching means for alternatively connecting said monitor circuit either directly to the output of said receiving circuit or directly to the output of said amplifier.

11. In a signal detection system, a superheterodyne receiver having means for converting its output to keyed tone signals, a sweep device for periodically changing the tuning of the heterodyne oscillator of said receiver over a predetermined range, whereby said receiver repeatedly scans a selected portion of the radio frequency spectrum, a plurality of pulse generators for generating pulses of adjustable width and timing, a phase shifter for each pulse generator having means for controlling the time of occurrence of each pulse within any desired position of the cycle, connections coupling said pulse generators to said sweep device whereby said generators synchronously operate in timed relation with the scanning of said receiver, an amplifier for the keyed tone output of said receiver, means for normally biasing said amplifier to anode current cut-off in the absence of signals from said receiver, a connection from the input circuit of said amplifier to said pulse generators in common, whereby the application of pulses to said connection by said generators provide an additional bias on said amplifier for the duration of each pulse of such sense as to prevent said amplifier from passing signal current, a recorder device connected to the output of said amplifier and having an element upon which the detected signals are to be recorded, a motor for driving said element, and noise discriminating means coupled to the output of said amplifier for operating said motor in the presence of signals to be detected, said noise discriminating means including a counter circuit which is responsive to the presence of signals in the output of said amplifier a predetermined number of times over successive sweep cycles.

12. In a signal receiving circuit, a tunable receiver, means for periodically tuning said receiver over a selected band of frequencies, a recording system, and means for rendering said system operative comprising a signal persistence circuit coupled to said receiver and responsive solely to the presence of signals to be detected which appear over a predetermined number of successive cycles of tuning.

13. In a radio receiving system, a tunable receiver, means for periodically tuning the receiver over a selected band of frequencies, an amplifier for the output of said receiver, said amplifier having a control electrode so biased that the amplifier passes signals which are supplied thereto by said receiver, a local pulse generator having means for adjusting the position and the width of the generated pulse in each cycle, means for synchronously operating said pulse generator in timed relation with said periodic tuning means, and a connection from said pulse generator to the input circuit of said amplifier for supplying the control electrode of said amplifier with pulses of negative polarity of such value as to bias said amplifier to the anode-current cut-off condition during the occurrence of said pulses even in the presence of signals from said receiver.

14. In a telegraph receiving system, a tunable receiver, means for periodically tuning the receiver over a selected band of frequencies, a local pulse generator, an electron discharge device circuit coupled to the output of said receiver, means for supplying pulses of such polarity and magnitude from said generator to the input of said electron discharge device circuit so as to bias said device to prevent certain signal pulses from the output of said receiver from passing through said electron discharge device circuit.

15. In a radio receiving system, a tunable receiver, means for periodically tuning the receiver over a selected band of frequencies, an electron discharge device circuit coupled to the output of said receiver, a local pulse generator producing pulses of predetermined polarity, a connection from said pulse generator to the input of said discharge device circuit for supplying said discharge device with pulses of such polarity as to change its bias, whereby certain signals from the output of said receiver can be prevented from affecting said discharge device.

16. For use with a superheterodyne receiver having a local oscillator for beating with the received carrier to produce an intermediate frequency wave, a reactance tube coupled to a frequency determining element of said oscillator, and an alternating current source of energy coupled to said reactance tube for causing said local oscillator to periodically change its frequency over a desired frequency range, to thereby cause the tuning of said receiver to change over a selected band of frequencies, a local pulse generator, connections from said pulse generator to said alternating current source for operating said pulse generator in synchronism with the periodic change in frequency of said local oscillator, and means for combining the output of said receiver with the pulses produced by said local generator.

17. In a signal receiving system, a tunable receiver, means for periodically tuning the receiver over a selected band of frequencies, a recording system, and means for rendering said recording system operative, said means including a signal persistence circuit coupled to said receiver and responsive solely to the presence of signals to be detected which appear over a predetermined number of successive cycles of tuning and at substantially the same positions in said successive cycles of tuning.

18. In a receiving system, a tunable receiver, means for periodically tuning the receiver over a selected band of frequencies, a vacuum tube coupled to the output of said receiver, a generator producing unidirectional pulses of relatively negative polarity, a connection from the output of said generator to said vacuum tube, whereby the pulses supplied by said generator bias said vacuum tube to prevent the passage of signals therethrough for the duration of each of said pulses, and a circuit for adjusting the time-position of said pulses relative to the commencement of a cycle of operation.

19. In a receiving system, a tunable receiver, a utilization circuit coupled to the output of said receiver, means coupled to said receiver and operating to cyclically and repeatedly tune the receiver over a selected band of frequencies, a pulse generator operating in synchronism with said means, a circuit for adjusting the time-position of the pulse produced by said generator relative to the commencement of a cycle of operation, and means coupled to said pulse generator and responsive to the pulses produced thereby at predetermined positions during the cycle of operations for preventing signals from being passed on by said receiver to said utilization circuit.

20. In a signal receiving system, a tunable receiver, means for cyclically causing said receiver to scan a range in which radio frequency signals from remote points may be received, a local pulse generator operating in synchronism with said means and producing pulses of predetermined polarity, means for varying the position of the pulse produced by said local pulse generator to any point in the cycle of operation while retaining such synchronism, and means for combining said pulses from said generator with the output of said receiver to blank out received signals from a part of said range corresponding in time position to the occurrence time of said pulses.

WARREN H. BLISS.
J. ERNEST SMITH.

REFERENCES CITED

The following references are of record in the file of this patent:

UNITED STATES PATENTS

| Number | Name | Date |
|---|---|---|
| 1,774,146 | Lesti | Aug. 26, 1930 |
| 1,917,268 | Mirick | July 11, 1933 |
| 2,275,016 | Koch | Mar. 3, 1942 |
| 2,158,285 | Koch | May 16, 1939 |
| 2,213,886 | Potter | Sept. 3, 1940 |
| 2,214,342 | Neufeld | Sept. 10, 1940 |
| 1,853,953 | Becker | Apr. 12, 1932 |
| Re. 22,150 | Bagno et al. | Aug. 4, 1942 |
| 1,994,232 | Schuck, Jr. | Mar. 12, 1935 |
| 2,273,914 | Wallace | Feb. 24, 1942 |
| 1,725,533 | Lee | Aug. 20, 1929 |
| 1,883,907 | Hathoway | Oct. 25, 1932 |
| 1,902,650 | Legg | Mar. 21, 1933 |

FOREIGN PATENTS

| Number | Country | Date |
|---|---|---|
| 506,133 | British | May 23, 1939 |
| 465,461 | British | Apr. 29, 1937 |